Patented Feb. 26, 1929.

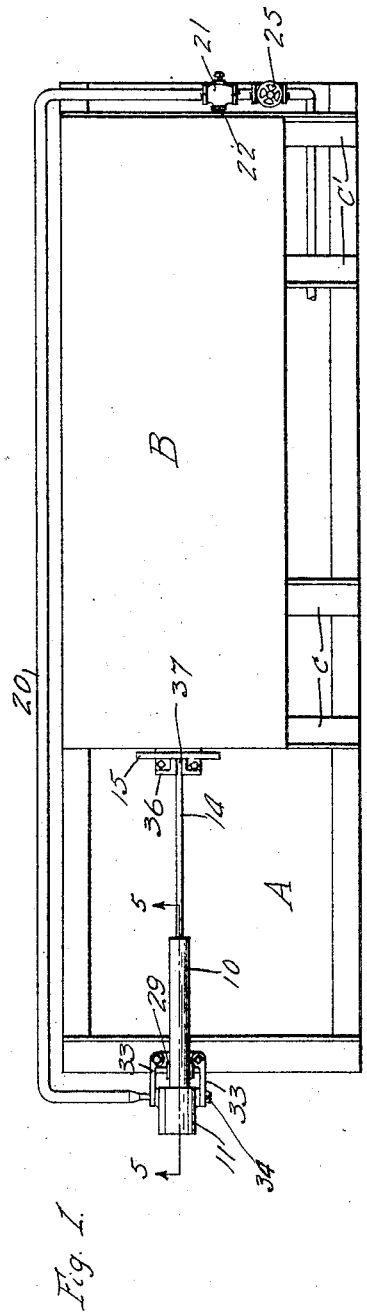
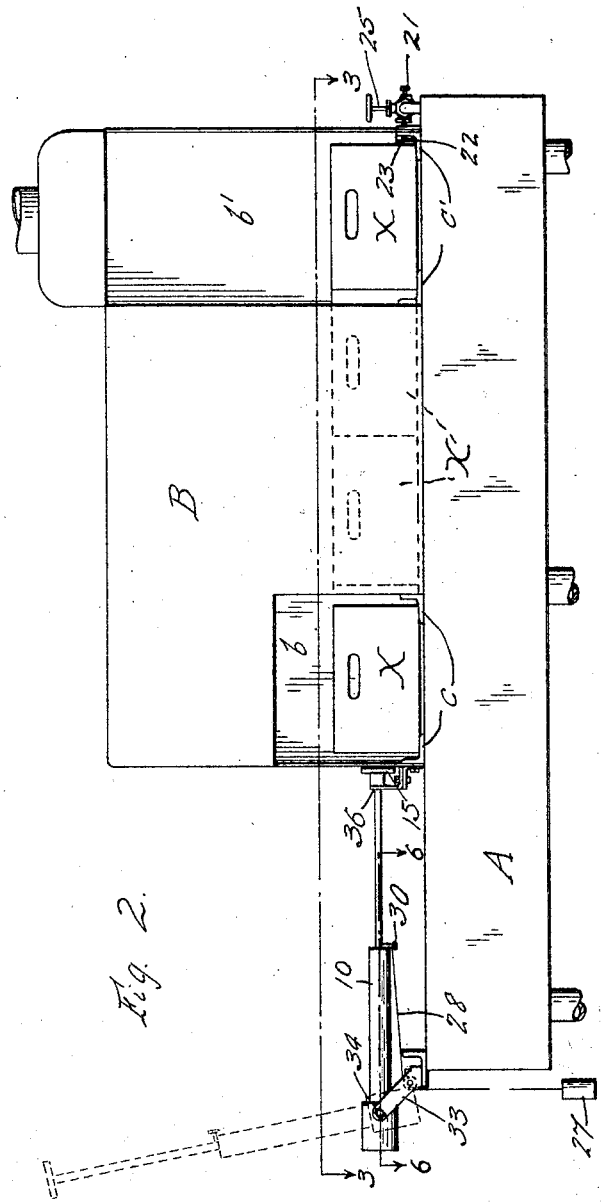

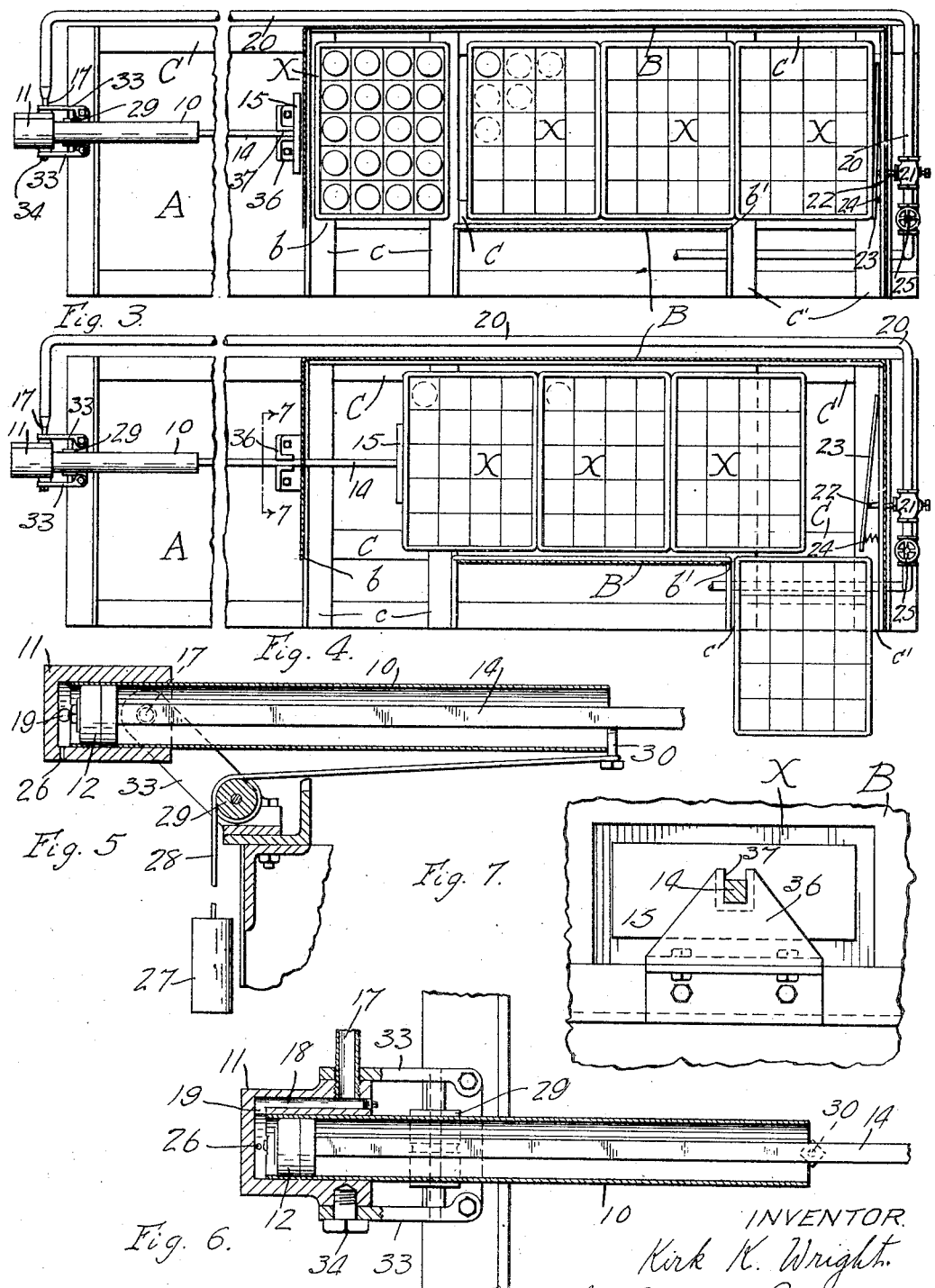

1,703,466

UNITED STATES PATENT OFFICE.

KIRK K. WRIGHT, OF BUFFALO, NEW YORK.

FEED MECHANISM.

Application filed April 5, 1927. Serial No. 181,248.

This invention relates to improvements in feed mechanisms for individual articles such, for example, as containers for fluids.

The objects of this invention are to provide an inexpensive and reliable feed mechanism which serves to feed a row of articles forwardly and which is actuated by the removal of one of the articles from the row; also to provide a feed mechanism of this kind which is so constructed that it can readily be moved out of its operative position into a position in which it affords free access to the apparatus on which it is mounted; also to provide a feed mechanism of this kind which is inexpensive to construct, easily applied to an apparatus on which articles are to be fed, and which is very reliable and positive in its operation; also to improve feed mechanisms of this kind in other respects hereinafter specified.

In the accompanying drawings,

Fig. 1 is a top plan view of a machine or apparatus for operating on bottles in crates, showing my improved feed mechanism applied thereto.

Fig. 2 is a front elevation thereof.

Fig. 3 is a fragmentary plan view thereof partly in section on line 3—3, Fig. 2.

Fig. 4 is a similar plan view showing the parts of the feed mechanism in different positions.

Fig. 5 is a fragmentary, sectional elevation thereof on an enlarged scale on line 5—5, Fig. 1.

Fig. 6 is a fragmentary, plan view thereof on line 6—6, Fig. 2.

Fig. 7 is a fragmentary, sectional elevation thereof on line 7—7, Fig. 4.

The feed mechanism is disclosed in the accompanying drawings as applied to a machine or apparatus for treating bottles contained in cases, for example, for washing, rinsing or sterilizing the bottles, but it will be understood that it is not intended to limit this invention for use in connection with the handling of bottle crates since the same may be used for feeding cans or other containers, or other articles to or through a machine or apparatus.

In the particular application of the feed mechanism shown, A represents a tank provided with a hood B over a portion thereof, the hood B being provided at $b$ with a receiving inlet for the cases, crates, or other articles X, and at $b'$ with a discharge opening for the articles. Inside of the hood B are provided tracks or guideways C on which the crates or articles may be positioned for movement through the hood portion of the apparatus, and the articles are preferably placed by hand on the guideways or tracks C by first placing the same on short transverse guideways or tracks $c$ extending through the receiving opening $b$ in the hood B, and then moving the same upon the tracks or guideways C, and when the articles are removed from the tracks or guideways C, they may be pulled through the opening $b'$ upon transverse tracks or guideways $c'$. The articles while positioned on the guides or tracks C under the hood B may be subjected to any desired operation or operations, no means for performing these operations being shown in the drawings. The apparatus thus far described, of itself, does not constitute a part of this invention and may be replaced by any other apparatus in which a row of articles are to be fed or advanced.

The means for advancing the articles lengthwise of the guides or tracks C include a fluid pressure operated plunger or push rod which operates to advance the row of articles X on the tracks or guides C whenever an article or articles at the head or leading end are removed, and the plunger or push rod is automatically retracted whenever the row of articles have been advanced to place one of the articles in the leading position shown on the right hand side of Figs. 1 to 4 inclusive. The fluid pressure operated plunger or push rod may be of any suitable or desired construction, that shown including a tube or cylindrical member 10, one end of which is secured in a head member 11 which is in the form of a short cylinder having one end thereof closed. In actual practice the cylinder head member 11 may be made of a casting and the cylinder member 10 may be formed of a length of seamless tubing, so that the cost of these parts is small. A piston or plunger 12 is adapted to reciprocate within the cylinder member 10, and a rod 14 is connected at one end to the plunger 12 and is provided at its other end with a transversely extending plate, push member or head 15 which is adapted to engage the last article in the row on the guide tracks C. Fluid pressure is admitted to the cylinder head 11 from a pipe 17, which, in the particular construction shown, enters a side of the head 11 and connects with a passage 18 extending lengthwise of the head and terminating at its inner end in an aperture 19 at the inner end of the cylinder head 11. The pipe or tube 17 preferably has a splined connection with a supply pipe 20 for the fluid. The pipe 20 extends into proximity to the discharge end of the apparatus and is provided adjacent to the discharge end with a valve 21 having a stem 22 extending into the path of movement of the foremost article of the row on the guide or track C. The construction of the valve 21 is not shown in detail but it will be understood that if the valve stem 22 is pushed inwardly into the housing of the valve, the flow of fluid through the valve is interrupted. Preferably a hinged plate or rod 23 engages the end of the valve stem 22 or is connected therewith, so that when this hinged member 23 is swung from the position shown in Fig. 4 into the position shown in Fig. 3, the stem 22 of the valve is moved inwardly thus interrupting the flow of fluid through the pipe 20. The plate or rod 23 may be moved outwardly into a valve opening position by a spring 24, as shown in Fig. 4, when the foremost article of the row is moved out of engagement with the plate or rod, or if desired the valve 21 may be provided with a spring or other means for opening the valve when no inward pressure is exerted on the stem 22. 25 represents a hand operated valve by means of which the flow of actuating fluid may be interrupted when the feed mechanism is not in operation. Other means for interrupting the supply of motive fluid to the cylinder, when the row has been moved to its final or advanced position, may be employed, if desired.

From the foregoing description it will be obvious that when the foremost article X nearest to the discharge opening $b'$ is drawn forwardly over the transverse tracks or guides $c'$ from the position shown in Fig. 3 into the position shown in Fig. 4, the stem 22 of the valve will move outwardly into a valve opening position as shown in Fig. 4, thus causing motive fluid to flow through the valve 21 and pipe 20 to the piston head 11. The motive fluid causes the plunger 12 to move the rod 14 and the pusher member or plate 15 on the end thereof against the last article of the row nearest to the feed or receiving end of the row, and push the various articles in the row to the right as shown in Fig. 4 until the first article in the row engages the pivoted rod or plate 23 and causes the valve stem 22 to be pushed into the valve 21 to interrupt the flow of fluid to the cylinder.

The return of the plunger 12, when the supply of fluid thereto is interrupted, may be effected in any suitable or desired manner. As illustrated by way of example in the construction shown, means are provided for relieving the pressure of the fluid acting on the plunger, and this may be accomplished by providing a discharge opening 26 in the cylinder head, which opening may be of small size and which acts as a bleeder. Also means of any suitable or desired construction are preferably employed for yieldingly drawing the plunger 12 back to its starting position as shown in Fig. 5, and for this purpose, in the particular construction shown, the plunger and rod 14 are drawn backwardly by means of a weight 27 hung on a cord 28 extending over a pulley 29 and attached to a pin or part 30 secured on the rod 14. As the fluid is gradually discharged through the vent hole or bleeder 25, the plunger 12 and the push plate 15 are returned to their initial positions due to the action of the weight 27, whereupon another article may be moved on the transverse guide rails $c$ into the last position in the row on the guide rails or tracks C. As soon as the articles in the row have been acted upon for a sufficient length of time, the operator draws the article nearest to the discharge end thereof forwardly on the rails or tracks $c'$, whereupon the valve 21 is again opened and the operation of the feeding mechanism is repeated.

If desired, the cylinder 10 and the rod 14 of the feed mechanism may be mounted in such a manner that they may be swung into substantially upright or inoperative position as shown in dotted lines in Fig. 2, for the purpose of rendering the portions of the tank A which normally lie below the cylinder 10 and rod 14 accessible. In the construction shown for this purpose the head 11 of the cylinder is pivoted on arms 33 of a bracket secured on the tank A or other support, and the pipe 17 by means of which the actuating fluid is transmitted to the head of the cylinder preferably forms one of the trunnions or pivots about the axis of which the head 11 of the cylinder 10 and the parts carried thereby may swing, a pivot stud or bolt 34 being provided at the opposite side of the cylinder head 11 in axial alinement with the pipe 17. The pulley 29 over which the weight cord 28 passes is also pivoted on the arms 33, so that the swinging of the cylinder and the rod 14 about the pivotal connection of the cylinder head with the arms 33 does not interfere with the weight 27 nor its cord 28. Preferably the outer end of the rod 14 is guided in its movement to advance the article X by a guide member 36 having an open slot 37 in the upper face thereof as shown in Fig. 7. When it is desired to swing the rod 14 and cylinder into their inoperative positions, the rod 14 is merely moved upwardly through the open end of the slot 37, and consequently when it is desired to return the parts to their operative positions, the rod is again inserted into the slot 37. This pivotal mounting of the cylinder and plunger of the feed mechanism is very desirable where the mechanism is used in connection with certain types of washing or sterilizing apparatus but it will be understood that the pivotal mounting may be dispensed with in cases where no need for such a mounting exists.

I claim as my invention:—

1. A feed mechanism including a member actuated by fluid pressure to exert a force against one end of a row of articles to advance the same to a final position, means for interrupting the flow of fluid to said member when said row reaches said final position, and means for returing said member to its initial position when the flow of said fluid is interrupted.

2. A feed mechanism including a member actuated by fluid pressure to exert a force against one end of a row of articles to advance said row lengthwise, a valve adjacent to the other end of said row and adapted to shut off the flow of motive fluid to said member when engaged by said other end of said row, and means for returning said member to its initial position when said flow of motive fluid is shut off.

3. A feed mechanism including a member actuated by fluid pressure to exert a force against one end of a row of articles to advance said row lengthwise, and means actuated by the other end of said row to interrupt the action of said member and to permit the return of said member to its initial position.

4. A feed mechanism including a cylinder, a plunger movable therein and actuated by fluid pressure to exert a force against one end of a row of articles to advance said row lengthwise, a valve for controlling the flow of fluid to said cylinder, and means actuated by the other end of said row to close said valve to interrupt the flow of fluid to said cylinder when said row has been advanced to its final position.

5. A feed mechanism including a cylinder, a plunger movable therein and actuated by fluid pressure to exert a force against one end of a row of articles to advance said row lengthwise, a valve for controlling the flow of fluid to said cylinder, means actuated by the other end of said row to close said valve to interrupt the flow of fluid to said cylinder when said row has been advanced to its final position, and means for returning said plunger to its initial position when said valve is closed.

6. A feed mechanism including a cylinder, a plunger movable therein and actuated by fluid pressure to exert a force against one end of a row of articles to advance said row lengthwise to a final position, a valve for interrupting the flow of fluid to said cylinder when said row has been moved to its final position, a vent in said cylinder, and means for returning said cylinder to its initial position when the flow of fluid to the cylinder is interrupted.

7. A feed mechanism including a cylinder, a plunger movable therein and actuated by fluid pressure to exert a force against one end of a row of articles to advance said row lengthwise, a valve for interrupting the flow of fluid to said cylinder when said row of articles has been advanced to its final position, a bleeder opening in said cylinder through which fluid is discharged, and means exerting a pressure on said plunger to return the same to its initial position when the fluid pressure tending to move said plunger against said row of articles is relieved.

8. A feed mechanism including a cylinder, a plunger movable therein and actuated by fluid pressure to exert a force against one end of a row of articles to advance said row lengthwise to a final position, a valve actuated by the leading article of said row when said row is in its final position to interrupt the flow of motive fluid to said cylinder, means for returning said plunger to its initial position when said valve is closed, and means for opening said valve when the foremost article of the row is removed from said row.

9. A feed mechanism including a member actuated by fluid pressure to exert a force against one end of a row of articles to advance the same to a final position, means for interrupting the flow of fluid to said member when said row reaches said final position, and means for supplying motive fluid to said member when the foremost article of said row is removed therefrom.

10. A feed mechanism including a member actuated by fluid pressure to exert a force against one end of a row of articles to advance said row lengthwise, a valve adjacent to the other end of said row and adapted to shut off the flow of motive fluid to said member when engaged by said other end of said row, and means for opening said valve when the foremost article at said other end of said row is removed from said row.

11. A feed mechanism including a member actuated by fluid pressure to exert a force against one end of a row of articles to advance the same to a final position, and a valve controlling the supply of motive fluid to said member and which is closed by the foremost article of a row when in said final position and which is opened when said foremost articles is removed from said row.

12. A feed mechanism including a cylinder, a plunger movable therein and actuated by fluid pressure to exert a force against one end of a row of articles to advance said row lengthwise, means for controlling the flow of motive fluid to said cylinder, and a pivotal mounting for said cylinder to permit said cylinder to be swung to a position out of operative relation to said row of articles.

13. A feed mechanism including a cylinder, a plunger movable therein and actuated by fluid pressure to exert a force against one end of a row of articles to advance said row lengthwise, means for controlling the supply of motive fluid to said cylinder, including a tube connected with said cylinder, and a pivotal mounting for said cylinder about the axis of said tube to permit said cylinder to be moved from an operative position in substantial alinement with said row of articles into an inoperative position out of alinement therewith.

14. A feed mechanism including a cylinder and a plunger movable therein and actuated by fluid pressure, a rod connected with said plunger and adapted to engage one end of a row of articles to advance the row lengthwise when said plunger is acted on by fluid pressure, a valve for controlling the supply of fluid pressure to said cylinder, a guide bracket for said rod, pivots on which said cylinder is mounted to permit said cylinder to swing from an operative position to an inoperative position in which said rod is moved out of engagement with said guide bracket.

KIRK K. WRIGHT.